(12) United States Patent
Degner et al.

(10) Patent No.: US 9,267,547 B2
(45) Date of Patent: Feb. 23, 2016

(54) TOOL-LESS QUICK-DISCONNECT POWER TRANSMISSION COUPLING ASSEMBLY

(75) Inventors: Steven W. Degner, West Bend, WI (US); Roger E. Salyers, Hartford, WI (US)

(73) Assignee: New Gencoat, Inc., Sussex, WI (US)

( * ) Notice: Subject to any disclaimer, the term of this patent is extended or adjusted under 35 U.S.C. 154(b) by 82 days.

(21) Appl. No.: 13/432,689

(22) Filed: Mar. 28, 2012

(65) Prior Publication Data

US 2012/0251230 A1    Oct. 4, 2012

Related U.S. Application Data

(60) Provisional application No. 61/468,695, filed on Mar. 29, 2011.

(51) Int. Cl.
| | |
|---|---|
| F16B 7/04 | (2006.01) |
| F16D 1/108 | (2006.01) |
| F16L 37/084 | (2006.01) |
| F16L 37/23 | (2006.01) |

(52) U.S. Cl.
CPC ............... *F16D 1/108* (2013.01); *F16B 7/042* (2013.01); *F16L 37/084* (2013.01); *F16L 37/23* (2013.01); *Y10T 403/599* (2015.01); *Y10T 403/7079* (2015.01)

(58) Field of Classification Search
CPC ........... F16B 7/042; F16D 1/10; F16D 1/108; F16L 37/084; F16L 37/23
USPC ................... 464/153, 182, 901, 50, 137, 138; 403/378, 1, 109.2, 109.3, 109.8, 325, 403/376, 377, DIG. 4, DIG. 6
See application file for complete search history.

(56) References Cited

U.S. PATENT DOCUMENTS

| | | | | |
|---|---|---|---|---|
| 2,935,338 | A * | 5/1960 | Mills, Jr. .................... | 251/149.5 |
| 3,473,261 | A * | 10/1969 | Sheckells ...................... | 464/182 |
| 4,139,222 | A * | 2/1979 | Loland ............................ | 285/27 |
| 5,323,812 | A * | 6/1994 | Wayne .......................... | 285/316 |
| RE34,822 | E * | 1/1995 | Mattson ......................... | 180/11 |
| 5,577,859 | A * | 11/1996 | Nau ............................... | 464/182 |
| 6,874,387 | B2 * | 4/2005 | Vaughn ......................... | 403/325 |
| 7,661,725 | B2 * | 2/2010 | Kouda .......................... | 285/316 |

* cited by examiner

*Primary Examiner* — Josh Skroupa
(74) *Attorney, Agent, or Firm* — Boyle Fredrickson, S.C.

(57) ABSTRACT

A power transmission coupling that includes a drive shaft hub selectively connectable to a driven shaft hub. The drive shaft hub includes a number of ball bearings disposed within bores in the drive shaft that are selectively engageable within a groove disposed on the driven hub. The bearings are selectively locked within the groove by a sleeve movable disposed around the drive hub over the bearings. The drive hub also includes a key secured thereto that is selectively received within notches or apertures formed in the driven hub to mechanically engage the drive hub with the driven hub for effective power transmission via the coupling.

18 Claims, 10 Drawing Sheets

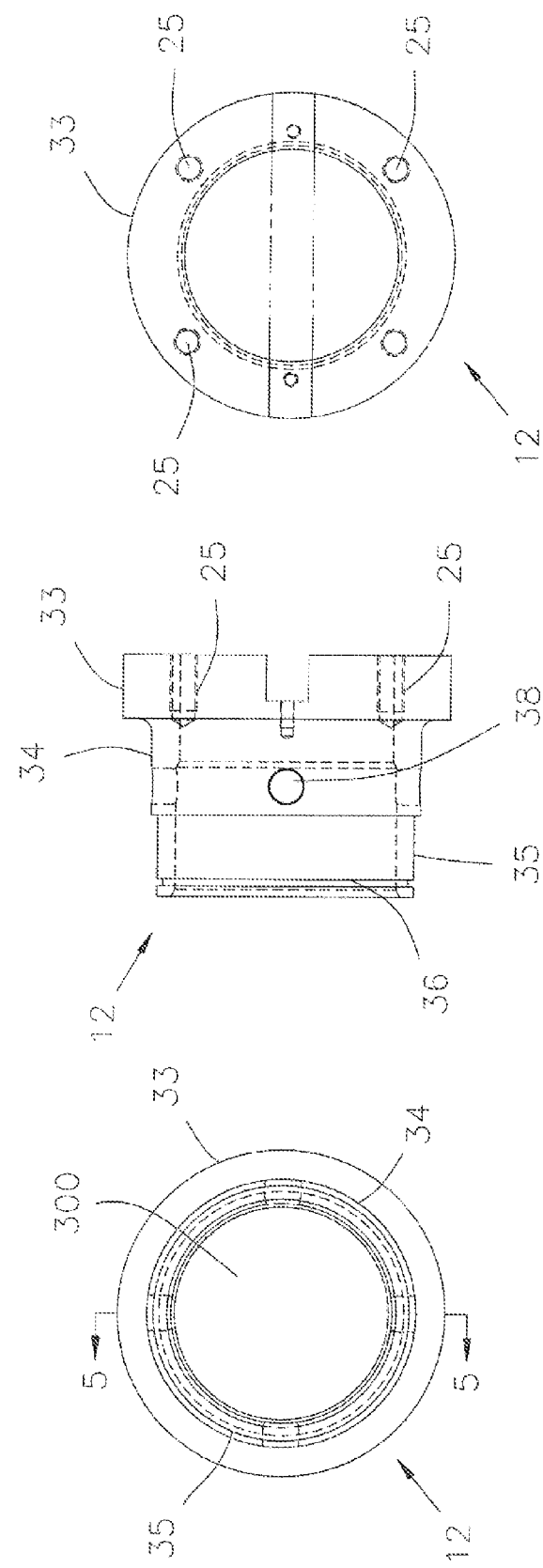

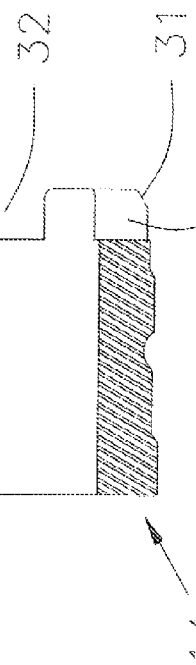
FIGURE 6
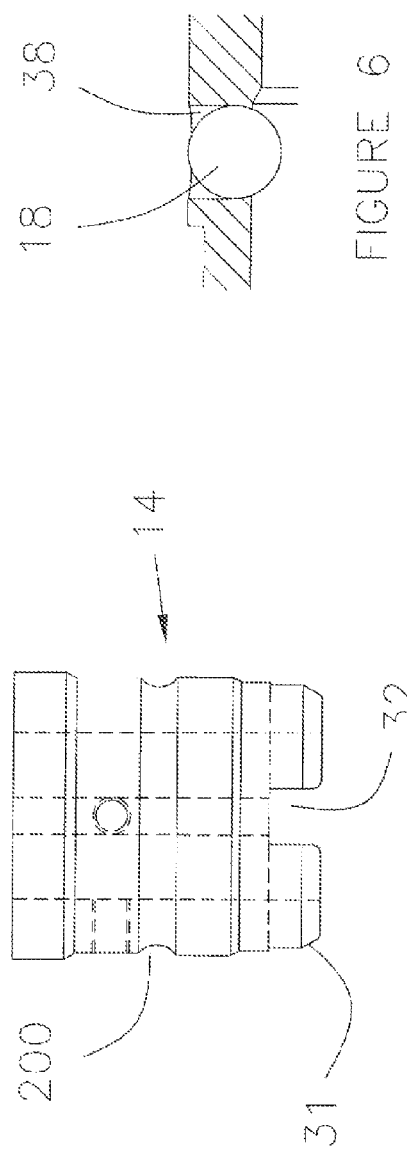
FIGURE 8
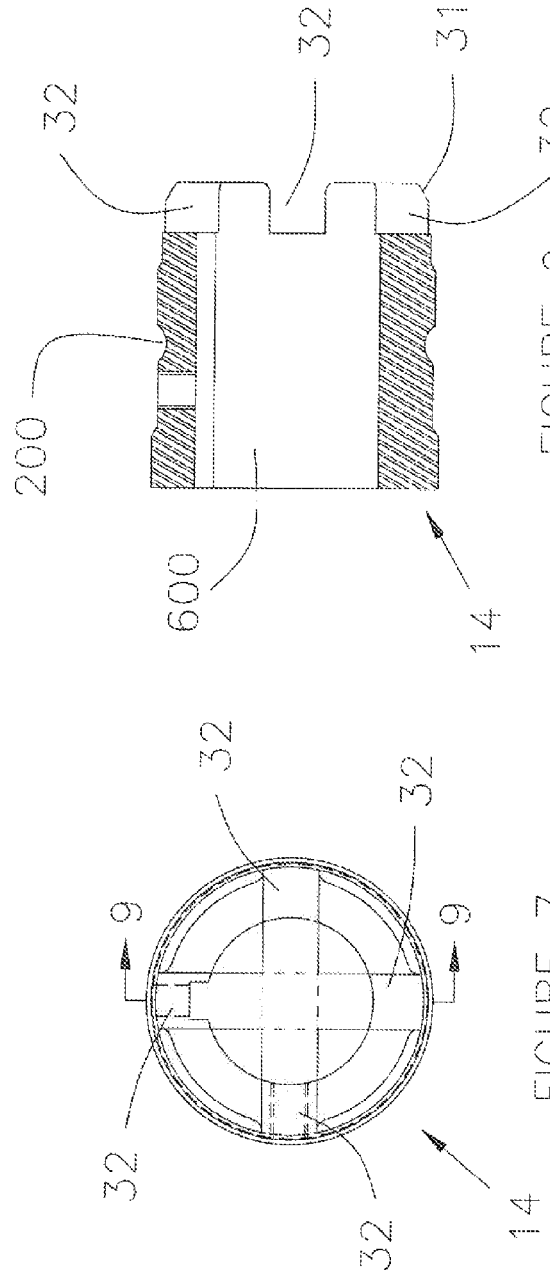
FIGURE 9
FIGURE 7

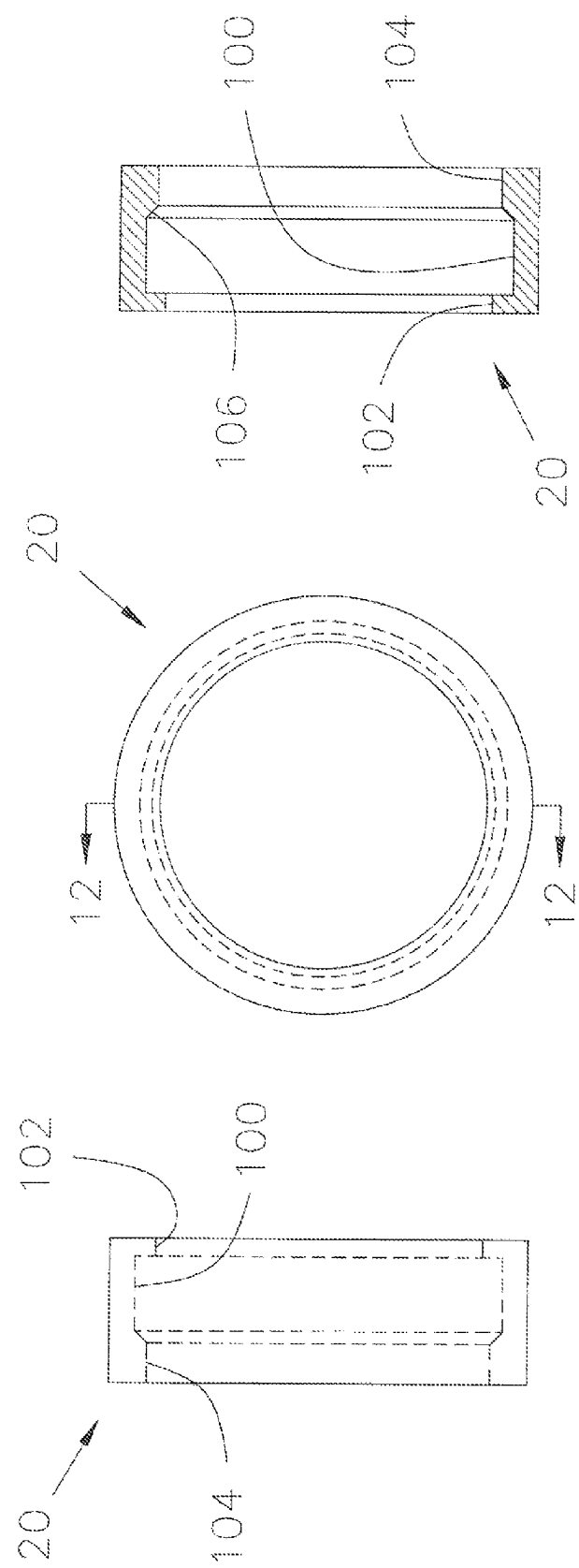

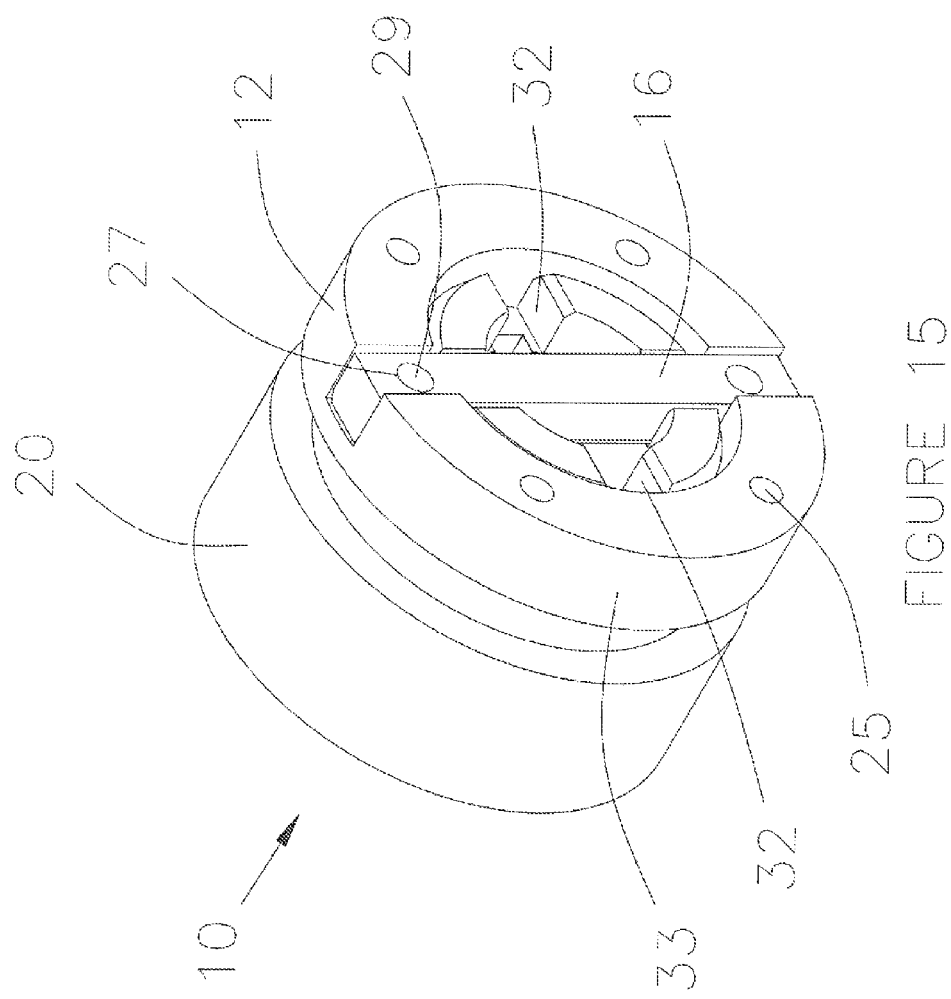

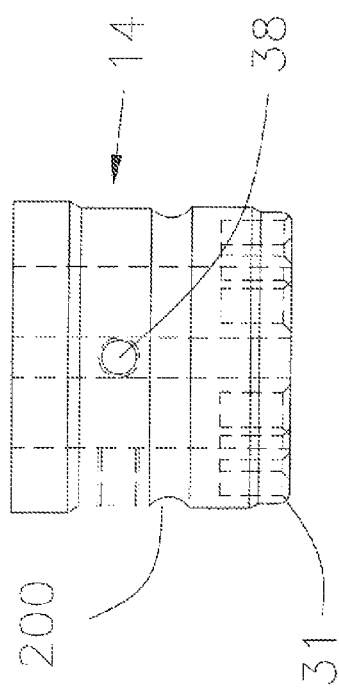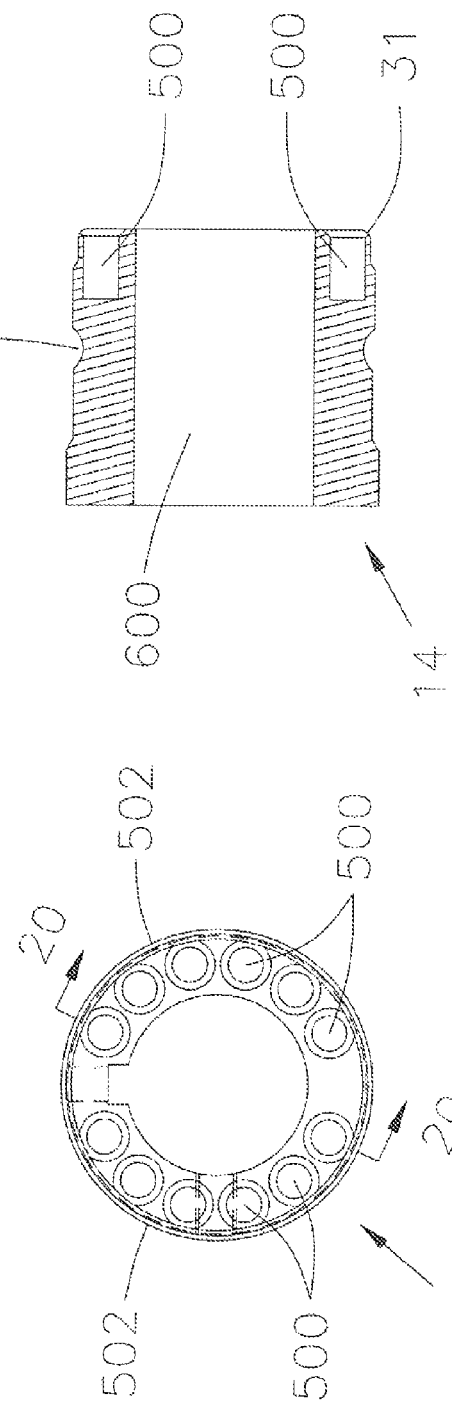

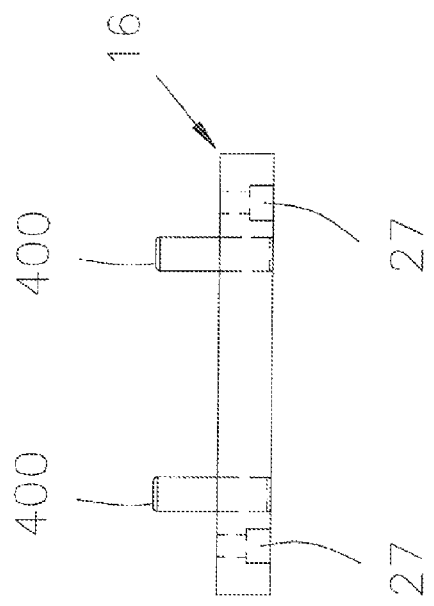
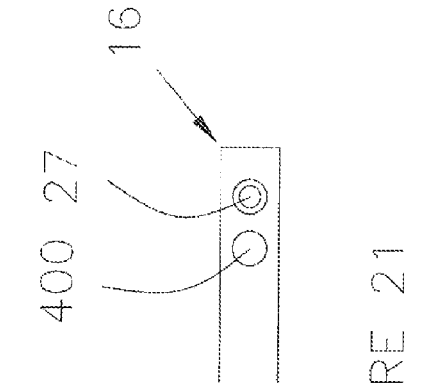
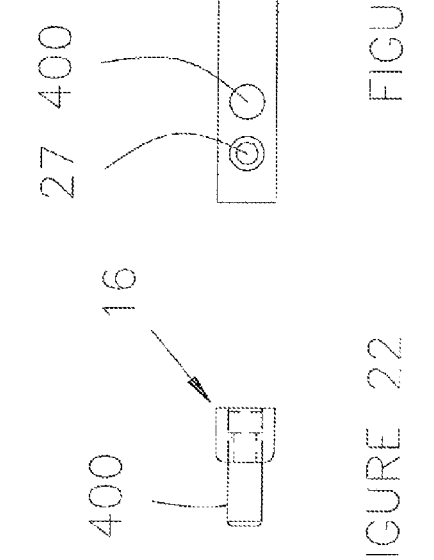

TOOL-LESS QUICK-DISCONNECT POWER TRANSMISSION COUPLING ASSEMBLY

CROSS-REFERENCE TO RELATED APPLICATIONS

This application claims priority from U.S. Provisional Patent Application Ser. No. 61/468,695, filed on Mar. 29, 2011, the entirety of which is hereby incorporated herein by reference.

FIELD OF THE INVENTION

The present invention relates to power transmission systems, and more specifically to a coupling for use in a power transmission system.

BACKGROUND OF THE INVENTION

Many different types of machines operate by transferring power from a power source in the form of rotational motion to a driven element to assist in performing the particular function of the machine. In many machines that operate in this manner, a rotating drive shaft rotates a driven shaft that is operably connected to the drive shaft.

In order to couple a drive shaft to a driven shaft, many different types and constructions for the power transmission couplings have been developed. The coupling securely engages the drive shaft to the driven that such that the rotation of the drive shaft is effectively transferred to the driven shaft so that the machine including the drive and driven shafts can operate to perform the desired function.

One concern with couplings of this type is the ability of the coupling to be easily and quickly engaged and disengaged, such as when the machine needs to be serviced, without the need for additional tools or implements to perform that function. In particular, many prior art couplings incorporate linear splined engagement mating surfaces, which is a tedious and difficult mechanism for interconnecting the coupling for its intended use in securing the drive and driven shafts to one another. A known disadvantage of splined interconnecting is the need for tight tolerances between mating surfaces to eliminate the possibility of vibration within the coupling assembly as it rotates. This need for tight tolerances predicates a deliberately precise engagement of the hubs, which is a detriment to the operator while attempting to support, control and install the driving hub and drive shaft to the driven hub.

Furthermore, in conjunction with radial groove (on the driven hub)-to-ball bearing-capturing of the coupling hubs, another disadvantage of splined interconnecting is that the entire set of linear splines must re-engage upon passing by the radial groove, because the radial groove interrupts the splines. Even slight misfit or misalignment of mating splines then causes considerable difficulty when attempting to complete the connection of the hubs.

Thus, there exists a need for a coupling construction that provides a simple and easy to engage/disengage construction for the selective interconnection of a drive shaft and a driven shaft for power transmission therebetween.

SUMMARY OF THE INVENTION

Therefore according to one aspect of the present invention, a transmission coupling assembly is provided that can be quickly and easily engaged and disengaged from the driven shaft and/or the drive shaft without the need for any tools or additional implements. The coupling overcomes the aforementioned disadvantages as it utilizes smooth diameter mating surfaces to engage and center the coupling hubs and only one torque transmitting member that must engage instead of many splines. The cost effectiveness of manufacturing by these means versus the use of splined mating surfaces is evident as well. The coupling is also able to securely hold the drive and driven shafts in engagement with one another to maintain an effective transmission of power from the drive shaft to the driven shaft.

According to another aspect of the present invention, the coupling includes a driven shaft hub including a number of apertures disposed therein. These apertures are alignable with engagement structures on a drive shaft hub. When the driven shaft is engaged with the drive shaft, the apertures in the driven shaft hub are positioned in alignment with the engagement structures to interconnect the driven and drive shaft hubs with one another to enable power transmission through the coupling.

According to a further aspect of the present invention, the drive shaft hub includes a locking mechanism that can be selectively disengaged when it is necessary to engage or disengage the driven shaft hub from the drive shaft hub. The locking mechanism is biased in order to maintain the locking mechanism in the locked configuration until it is desired to disengage the mechanism.

Other aspects, advantages and features of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 2 is a side plan view of a driveshaft hub of the assembly of FIG. 1;

FIG. 3 is a front plan view of the driveshaft hub of FIG. 2;

FIG. 4 is a rear plan view of the driveshaft hub of FIG. 2;

FIG. 6 is a partially broken away, cross-sectional view of a bearing engaged with the driveshaft hub of FIG. 2;

FIG. 7 is a front plan view of a driven shaft hub of the assembly of FIG. 1;

FIG. 8 is a side plan view of the driven shaft hub of FIG. 7;

FIG. 9 is a cross-sectional view along line 9-9 of FIG. 7;

FIG. 10 is a side plan view of a locking sleeve of the assembly of FIG. 1;

FIG. 11 is a front plan view of the sleeve of FIG. 10,

FIG. 12 is a cross-sectional view along line 11-11 of FIG. 10;

FIG. 15 is an isometric view of the assembly of FIG. 1;

FIG. 18 is a front plan view of a driven shaft hub of the assembly of FIG. 17;

FIG. 19 is a side plan view of the driven shaft hub of FIG. 18;

FIG. 20 is a cross-sectional view along line 20-20 of FIG. 18;

FIG. 21 is a front plan view of a key of the assembly of FIG. 16;

FIG. 22 is a side plan view of the key of the assembly of FIG. 16; and

FIG. 23 is a top plan view of the key of the assembly of FIG. 16.

DETAILED DESCRIPTION OF THE INVENTION

Figure 1:
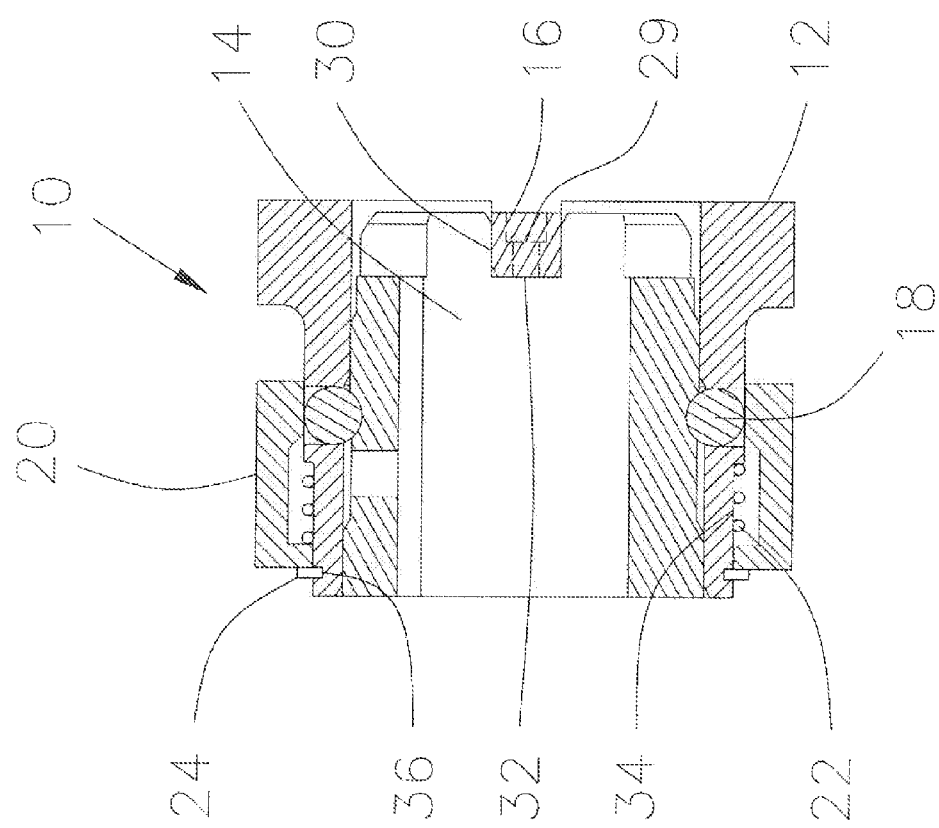
FIG. 1 is a cross-sectional view of a first embodiment of the coupling assembly of the present invention.
Figure 5:
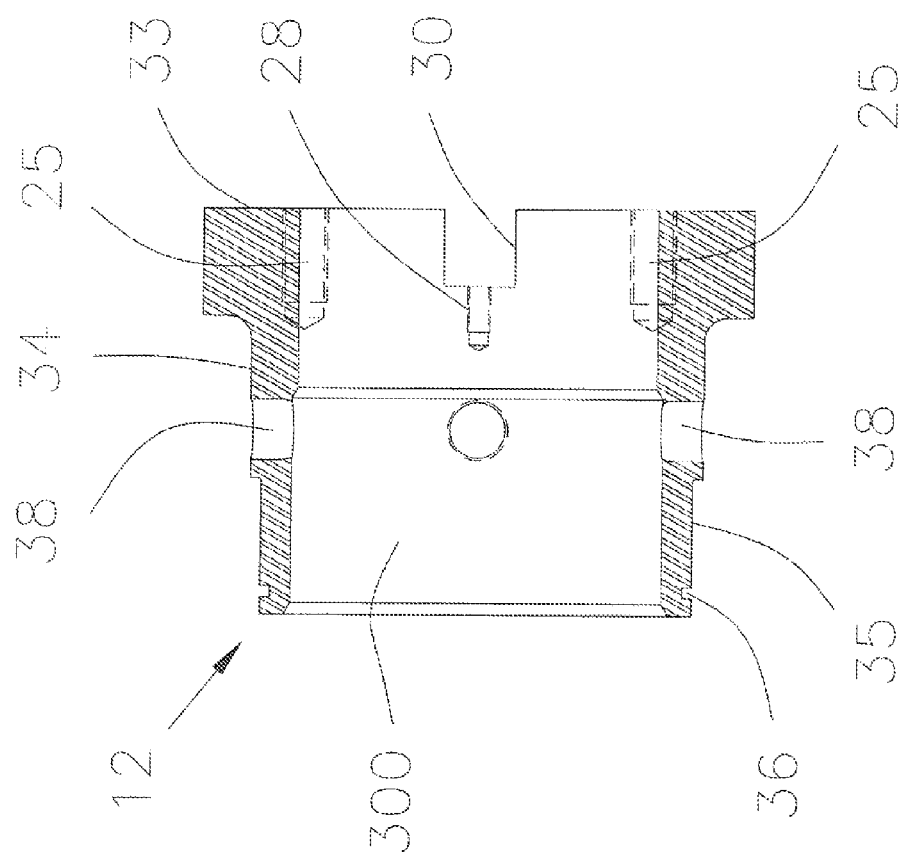
FIG. 5 is a cross-sectional view along line 5-5 of FIG. 3.

With reference now to the drawing figures in which like reference number designate like parts throughout the disclosure, a power transmission coupling assembly is indicated generally at 10 in FIG. 1. The coupling assembly 10 is a mechanical, quick-disconnect power transmission, or drive shaft coupling. Specific to this design is the ability to quickly connect and disconnect the individual halves or hubs 12,14 of the coupling 10 without the use of tools, and only the use of the operator's hands.

In one embodiment for the coupling assembly 10, the coupling 10 is for use in a metal strip processing roll coater machine (not shown). The roll coater incorporates cylindrical rollers (not shown) which apply a variety of liquid coatings to metal strip as it passes through the machine. Each roller is driven by a motor/reducer combination (not shown) which is affixed to a drive shaft (not shown). The coupling 10 joins the drive shaft to the roller, such as to a central driven shaft or journal (not shown) of the roller.

Operators of a roll coater must frequently disconnect and reconnect the drive shafts and the rollers for various purposes, such as to swap out the rollers for different applications. The more efficiently this task is able to be done, the less downtime is required for the task and more desirable and economical is the functionality of the machine for the operator. This is where the nature of the coupling 10 is particularly paramount.

Referring now to FIGS. 1-15, the coupling assembly 10 is mainly comprised of a driving hub 12, a driven hub 14, a key or power transmitting member 16, ball bearings 18, a locking sleeve 20, a spring 22 and a retaining ring 24.

The driven hub 14, as best shown in FIGS. 7-9, is formed of a suitable material capable of handling the stress of the power transmission, such as a metal or hard plastic, and in the illustrated embodiment is formed to be generally cylindrical in shape, defining a central passage 600. The driven hub 14 is affixed to the journal (not shown) of the roller in any suitable manner, such as by using suitable means (not shown) such as mechanical fasteners or welds.

The driving hub 12, as best shown in FIGS. 2-5, is also formed of a suitable material capable of handling the stress of the power transmission, such as a metal or hard plastic, and in the illustrated embodiment is also formed to be generally cylindrical in shape, defining a central passage 300. The exterior surface of the drive hub 12 includes a large diameter section 33, an intermediate diameter section 34 and a small diameter section 35. The drive hub 12 is connected to the drive shaft in any suitable manner, such as by using mechanical fasteners (not shown) engaged with the drive shaft and inserted into blind bores 25 in the driving hub 12. The driven hub 14 is formed to have a diameter slightly less than that of the driving hub 12, such that the driven hub 14 can be inserted within the central passage 300 of the drive hub 12.

Figure 13:
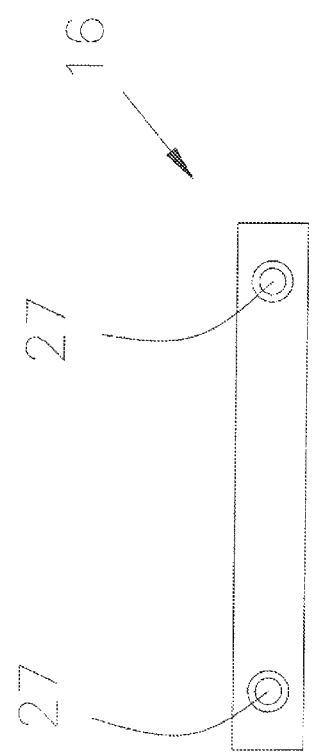
FIG. 13 is a front plan view of a key of the assembly of FIG. 1.
Figure 14:
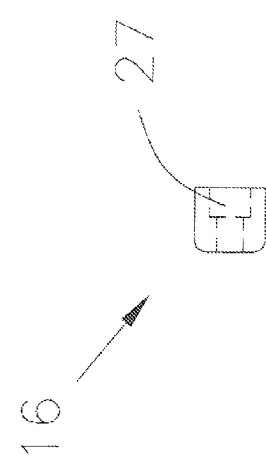
FIG. 14 is a side plan view of the key of FIG. 13.
Figure 17:
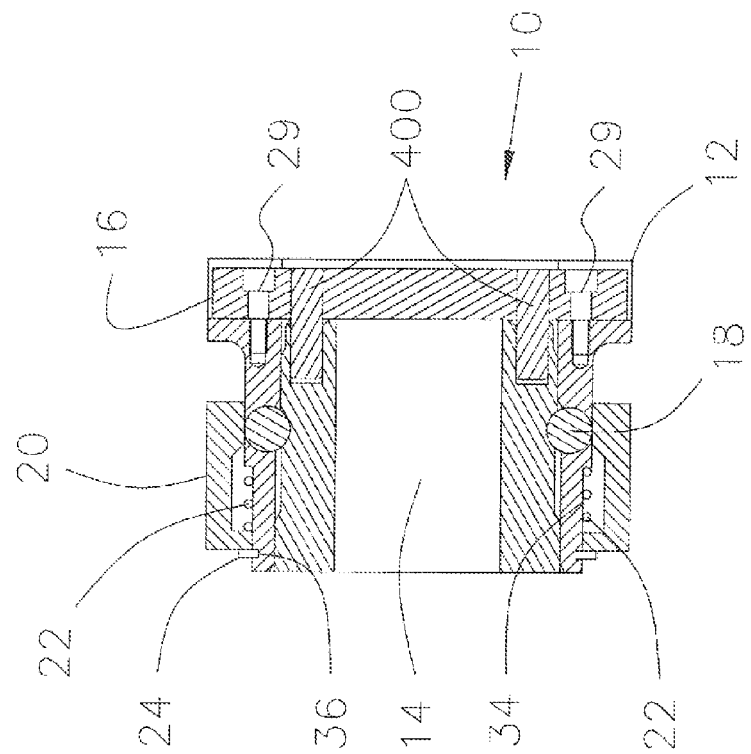
FIG. 17 is a cross-sectional view along line 17-17 of FIG. 16
Figure 16:
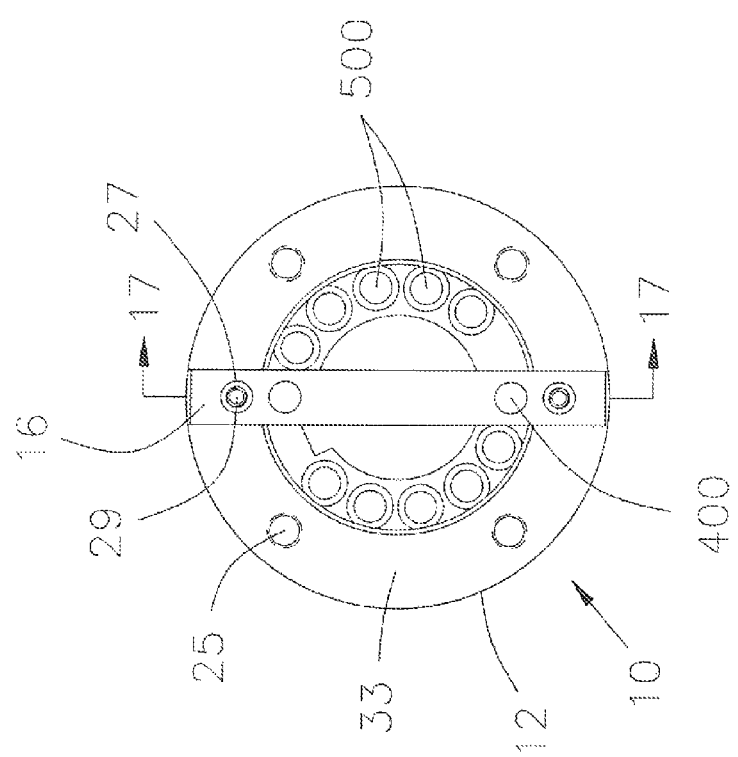
FIG. 16 is a front plan view of a second embodiment of the coupling assembly of the present invention.

The key 16, as best shown in FIGS. 13-14, is formed of a suitable material capable of handling the stress of the power transmission, such as a metal or hard plastic, and can be formed to have any suitable shape, which in the illustrated embodiment is generally rectangular in cross-section.

To operably align and connect the drive or driving hub 12 to the driven hub 14 and enable power transmission therebetween, the drive hub 12 includes an aligning structure, which in the illustrated embodiment is formed of a pair of inwardly extending slots 30 formed in the end of the drive hub 12 formed by the large diameter section 33. The slots 30 have a shape complementary to that of the key 16, which is attached to the driving hub 12 by seating the key 16 securely within the opposed slots 30 such that the key 16 extends between the opposed slots 30 formed in the drive hub 12 across the central passage 300. The key 16 is retained in this position in any suitable manner, and in the illustrated embodiment this is accomplished by using fasteners 29 that are inserted through the bores 27 in the key 16 and engaged within corresponding aligned apertures 28 in the drive hub 12.

When the driven hub 14 is inserted into the driving hub 12, the key 16 is positioned within corresponding notches 32 in the driven hub 14, thereby mechanically engaging the driven hub 14 to the driving hub 12 and allowing transmittal of power through the assembly 10 from the rotating driveline to the roller. In one embodiment of the driven hub 14, the hub 14 includes two pairs of notches 32 offset by ninety degrees (90°) to enable the driven hub 14 to engage the drive hub 12 in two separate positions, thereby increasing the ease of connecting the hubs 12,14 in conjunction with a tapered or curved surface 31 on the driven hub 14.

Looking now at FIGS. 16-23 a second embodiment of the assembly 10' is illustrated in which the alignment structure forming the connection between the key 16 and the driven hub 14 is altered. In this embodiment, as best shown in FIGS. 21-23, the key 16 includes a pair of pins 400 extending outwardly from the key 16 into the central passage of the drive hub 12.

The pins 400 are alignable with opposed pairs of axially extending apertures 500 formed in the driven hub 14 in place of the notches 32. As best shown in FIGS. 16-20, when the driven hub 14 is inserted within the passage 300 of the drive hub 12, the pins 400 are received in aligned pairs of the apertures 500 to mechanically engage the hubs 12, 14. Further, as shown in the illustrated embodiment, due to the position of two separate arrays 502 of apertures 500 on opposed sides of the driven hub 14, there are multiple angular positions in which the pins 400 can be aligned with a pair of apertures 500. While the number and size of the apertures 500 and the corresponding size of the pins 400 can be varied as desired to provide the desired number of angular configurations in which the pins 400 can be engaged within the apertures 500, in a preferred embodiment the apertures 500 are positioned to provide engaged configurations between the hubs 12, 14 at approximately twenty-six degree (26°) increments.

Looking now at FIGS. 1-6 and 10-12, the sleeve 20 is positioned around the driving hub 12 over intermediate and small diameter sections 34, 35 formed on the exterior of the hub 12. The sleeve 20 has an outer diameter approximately equal to that of the large diameter section 33 of the drive hub 12 to reduce the overall profile of the coupling 10. In the illustrated embodiment, the generally smooth exterior surfaces of the sleeve 20 and the drive hub 12 also eliminates a number of projecting surfaces present on prior art couplings, and greatly reduces the number of exposed surfaces on the coupling 10 that can potentially snag or otherwise become engaged with loose clothing or other items, which consequently reduces the chance of injury when the machine utilizing the coupling 10 is in operation.

The interior of the sleeve 20 includes a circumferential recess or cavity 100 that is disposed in alignment with the small and intermediate diameter sections 34, 35 of the drive hub 12. The cavity 100 is bounded by a first radially inwardly extending tab 102 at one end and a second radially inwardly extending tab 104 located opposite the first tab 102 that is joined to the cavity by a sloped surface 106. The first tab 102 has an inner diameter slightly larger than that of the small diameter section 35 of the drive hub 12, and the second tab 104 has a diameter slightly larger than that of the intermediate section 34. The inner diameter of the second tab 104 is less than the diameter of the large diameter section 33 of the hub 12 such that the large diameter section 33 engages the second tab 104 and retains the sleeve 102 on the hub 12.

Looking now at FIG. 1, opposite the large diameter section 35, the sleeve 20 is additionally retained on the hub 12 by a stop or retaining ring 24 engaged around the hub 12, such as in a peripheral notch 36 disposed in the small diameter section 35 generally opposite the slots 30. The ring 24, by engaging the first tab 102, keeps the sleeve 20 on the hub 12 while enabling the sleeve 20 to slide with respect to the hub 12.

The spring 22 is disposed around the small diameter section 35 of the hub 12 within the cavity 100, such that the spring 22 is held in compressive engagement between the intermediate diameter section 34 of the hub 12 and the first tab 102 of the sleeve 20. Thus, the spring 22 continuously urges the sleeve 20 towards the ring 24 to keep the cavity 100 over the reduced diameter section 34.

In the locked position shown in FIG. 1, the second tab 104 of the sleeve 20 covers a number of bores 38 formed within the intermediate diameter portion 34 of the hub 12 and in each of which is positioned a ball bearing 18. The bearing 18 is free to move within each of the bores 38 the on the driving hub 12. The bearings 18 protrude into the central passage 300 of the hub 12 when engaged by the second tab 104 of the sleeve 20. In this position, when the driven hub 14 is inserted within the drive hub 12, the bearings 18 extend into a peripheral groove 200 formed in the exterior of the driven hub 14 to hold the driven hub 14 in engagement with the drive hub 12.

The coupling 10 meets the needs of easily repeated quick connecting and quick disconnecting by the operator. Hereby, the coupling 10 allows initial engagement of the hubs 12, 14 without the need to perfectly align torque transmitting members. Once the hubs 12, 14 begin engagement, the drive shaft and attached driving hub 12 can be supported by the driven hub 14, so the operator does not need to be concerned with supporting its weight and bulk while simultaneously attempting to engage torque transmitting members. At that point, the operator can then focus on completing the engagement of coupling hubs 12, 14 by mating the torque transmitting members, which is aided by transitioned engagement surfaces on the exterior of the driven hub 14 and the interior of the driving hub 12.

In operation, common to both the connection and disconnection of the coupling 10, the operator draws the coupling sleeve 20 linearly along the coupling axis, thereby causing the first tab 102 to compress the spring 22 and moving the cavity 100 over the bores 38, the centerlines of which are perpendicular to the coupling assembly axis. When the sleeve 20 is drawn along the drive hub 12, the position of the cavity 100 over the bores 38 allows the ball bearings 18 the freedom to move through the cylindrical bores 38 away from the inside diameter of the driving hub 12 to protrude into the cavity 100 of the sleeve 20, such that the bearings 18 are not located at all within the passage 300 of the drive hub 12. When given this degree of freedom, the ball bearings 38 offer no resistance to the insertion or removal of the driven coupling hub 14 in relation to the driving hub 12.

As the operator begins to release the sleeve 20, the spring 22 forces the sleeve 20 back linearly toward its resting, or locked position. As the sleeve 20 moves, the transition of diameters on the inside surface of the sleeve 20 along the sloped surface 106 between the cavity 100 and the second tab 104 allows the sleeve 20 to contact the ball bearings 18, simultaneously driving them back through their cylindrical holes 38 toward and into the passage 300 of the driving hub 12.

The locked condition of the fully connected coupling hubs 12, 14 is maintained by the relationship between the extreme inner diameter of the second tab 104 on the sleeve 20 and the position of the cylindrical holes 38 in the driving hub 12. This relationship creates a captured state of the ball bearings 18 to a predetermined protrusion of the ball bearings 18 into the central passage 300 of the driving hub 12. Only when the driven hub 14 is fully connected with the driving hub 12 can the operator completely release the sleeve 20 which forces the ball bearings 18 evenly into the radial groove 200 of the driven hub 14, thereby holding the driven hub 14 in correlation to the driving hub 12. This is then the fully connected and locked condition of the coupling assembly 10 at which point it is ready to perform work.

Conversely, to relieve the coupling 10 from its working condition, when the driveline is static, the operator is to draw or compress the sleeve 20, thereby allowing each ball bearing 18 its freedom of movement, as the operator, while holding the sleeve 20 in its drawn position, pulls the entire driving hub 12 and drive shaft linearly off the driven hub 14. As this disconnecting movement occurs, the contour of the radial groove 200 of the driven hub 14 automatically forces the ball bearings 18 through their cylindrical bores 38 and into the sleeve cavity 100, which allows for the complete removal of the driving hub 12 and drive shaft. Notable to this application is that the drive shaft is collapsible. This is then the fully disconnected condition of the coupling assembly 10.

Aside from the simple function of the sleeve 20 under spring force, there is no need for a dedicated individual hub-locking assembly in the coupling 10. This thereby eliminates the need for many more component parts, associated costs, assembly and maintenance thereof. In addition, since the coupling 10 works on a horizontal axis, the forces that may act upon the coupling assembly 10, and specifically its locking feature, are known and limited. This therefore compliments the practical simplicity of the sleeve-locking feature.

As an additional beneficial feature of the construction of the assembly 10, the operator has the advantage of utilizing the movement and force of hands and arms in the same linear direction to simultaneously and comfortably compress the sleeve 20 and disconnect the driving hub 12 and drive shaft from the driven hub 14.

While the concepts of the present disclosure will be illustrated and described in detail in the drawings and description, such an illustration and description is to be considered as exemplary and not restrictive in character, it being understood that only the illustrative embodiments are shown and described and that all changes and modifications that come within the spirit of the disclosure are desired to be protected. There are a plurality of advantages that may be inferred from the present disclosure arising from the various features of the apparatus, systems, and methods described herein. It will be noted that alternative embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the disclosure as defined by the appended claims.

We claim:

1. A tool-less quick-disconnect power transmission coupling comprising:
   a) a drive hub adapted to be operably connected to a drive shaft;
   b) a driven hub including a peripheral groove and adapted to be operably connected to a roller journal and including an alignment structure thereon;
   c) at least one ball bearing disposed within a radial bore in the drive hub and selectively engageable within the peripheral groove on the driven hub;
   d) a locking sleeve disposed around the drive hub and engaged with the at least one ball bearing;
   e) a spring engaged between the sleeve and the drive hub and operable to bias the sleeve into a locked position; and
   f) a key that is separate from but disposed on and connected to the drive hub and selectively and directly engaged with the alignment structure disposed on the driven hub.

2. The coupling of claim 1 wherein the alignment structure comprises at least one notch formed in the driven hub shaped complementary to the key.

3. The coupling of claim 2 wherein the alignment structure comprises two pairs of opposed notches.

4. The coupling of claim 3 wherein the two pairs of opposed notches are spaced 90° from one another.

5. The coupling of claim 1 wherein the alignment structure comprises at least one axially extending aperture formed in the driven hub that is engageable with at least one pin disposed on the key.

6. The coupling of claim 5 wherein the alignment structure comprises:
   a. a pair of pins disposed on the key and spaced from one another; and
   b. a number of axially extending apertures disposed around the periphery of the driven hub.

7. The coupling of claim 6 wherein the alignment structure comprises a pair of spaced arrays of axially extending apertures in the driven hub.

8. The coupling of claim 7 wherein the apertures in the spaced arrays are angularly spaced approximately 26°.

9. The coupling of claim 1 where in the drive hub comprises:
   a. a large diameter section;
   b. an intermediate diameter section disposed adjacent the large diameter section; and
   c. a small diameter section disposed adjacent the intermediate diameter section opposite the large diameter section.

10. The coupling of claim 9 wherein the sleeve comprises:
   a. a first radially inwardly extending tab having an inner diameter larger than the diameter of the small diameter section on the drive hub; and
   b. a second radially inwardly extending tab having an inner diameter larger than the diameter of the intermediate diameter section on the drive hub.

11. The coupling of claim 10 where in the sleeve further comprises a circumferential cavity located between the first tab and the second tab and within which is disposed the spring.

12. The coupling of claim 11 further comprising a sloped surface disposed between the cavity and the second tab.

13. The coupling of claim 10 further comprising a retaining ring disposed on the small diameter section of the drive hub opposite the large diameter section, the retaining ring engageable with the first tab on the sleeve.

14. The coupling of claim 1 wherein the sleeve has an outer diameter equal to that of the large diameter section of the drive hub.

15. A method of transmitting power from a drive shaft to a driven shaft utilizing the coupling of claim 1.

16. A tool-less quick-disconnect power transmission coupling comprising:
   a) a drive hub adapted to be operably connected to a drive shaft;
   b) a driven hub including a peripheral groove and adapted to be operably connected to a roller journal and including an alignment structure thereon;
   c) at least one ball bearing disposed within a radial bore in the drive hub and selectively engageable within the peripheral groove on the driven hub;
   d) a locking sleeve disposed around the drive hub and engaged with the at least one ball bearing;
   e) a spring engaged between the sleeve and the drive hub and operable to bias the sleeve into a locked position; and
   f) a key disposed on and connected to the drive hub to extend across but not beyond a diameter of the drive hub and selectively and directly engaged with the alignment structure disposed on the driven hub.

17. The coupling of clam 16 wherein the key extends across a diameter of the driven hub.

18. A tool-less quick-disconnect power transmission coupling comprising:
   a) a drive hub adapted to be operably connected to a drive shaft;
   b) a driven hub including a peripheral groove and adapted to be operably connected to a roller journal and including an alignment structure thereon;
   c) at least one ball bearing disposed within a radial bore in the drive hub and selectively engageable within the peripheral groove on the driven hub;
   d) a locking sleeve disposed around the drive hub and engaged with the at least one ball bearing;
   e) a spring engaged between the sleeve and the drive hub and operable to bias the sleeve into a locked position; and
   f) a key that is separate from but disposed on and connected to the drive hub and selectively and directly engaged with the alignment structure disposed on the driven hub, wherein the drive hub, key and the driven hub are rotatable in conjunction with the drive shaft and with one another when engaged to form the power transmission coupling.

* * * * *